Oct. 22, 1940.  T. NISHIGUCHI  2,219,015
MACHINE FOR MANUFACTURING FISHING NETS AUTOMATICALLY
Filed Aug. 8, 1939  7 Sheets-Sheet 2

INVENTOR:
TAKAO NISHIGUCHI
BY: Haseltine Lake & Co.
ATTORNEYS.

INVENTOR:
TAKAO NISHIGUCHI
BY: Haseltine, Lake & Co.
ATTORNEYS.

INVENTOR:
TAKAO NISHIGUCHI
BY: Haseltine, Lake & Co.
ATTORNEYS.

Patented Oct. 22, 1940

2,219,015

UNITED STATES PATENT OFFICE 2,219,015

MACHINE FOR MANUFACTURING FISHING NETS AUTOMATICALLY

Takao Nishiguchi, Yokkaichi, Miye-Ken, Japan

Application August 8, 1939, Serial No. 288,922

3 Claims. (Cl. 96—21)

The present invention relates to an improved machine and a method for making a double knotted or a single knotted net.

In the accompanying drawings I have shown the best form in which I have contemplated making the machine embodying the apparatus of my invention, and said invention is fully disclosed in the following description and claims.

Figure 1:
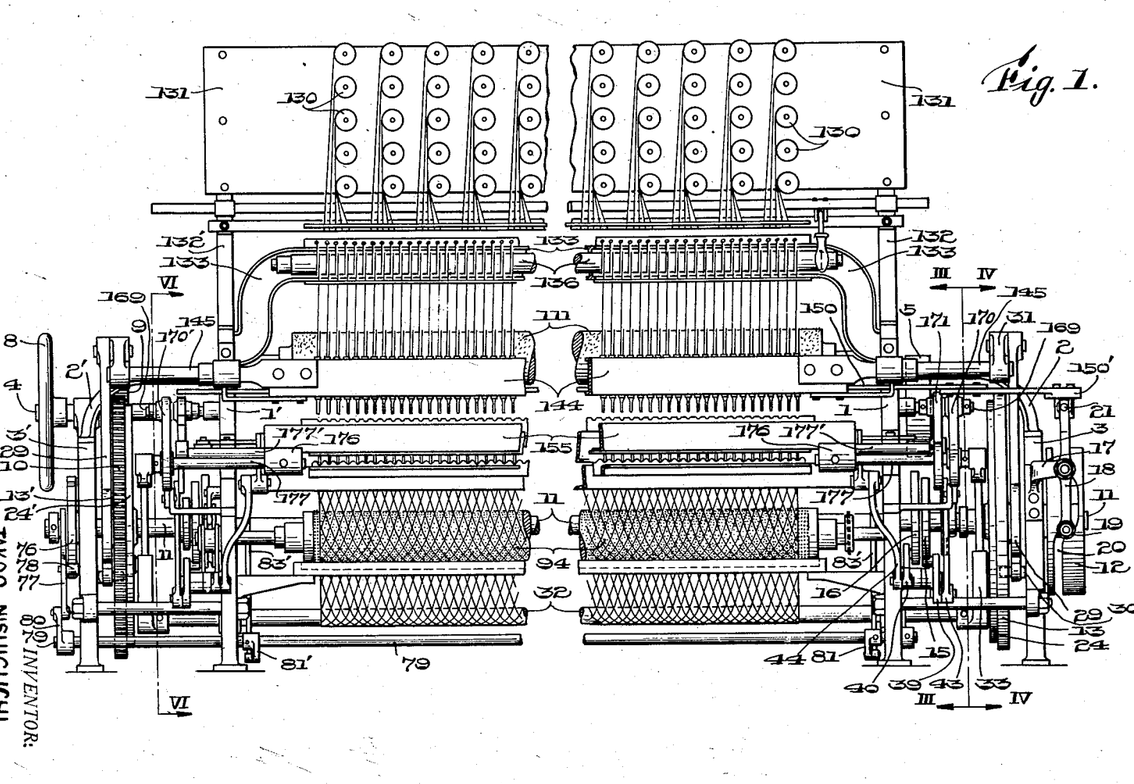
Figure 1 is a front elevation of the net making machine according to this invention.
Figures 2, 3, 4:
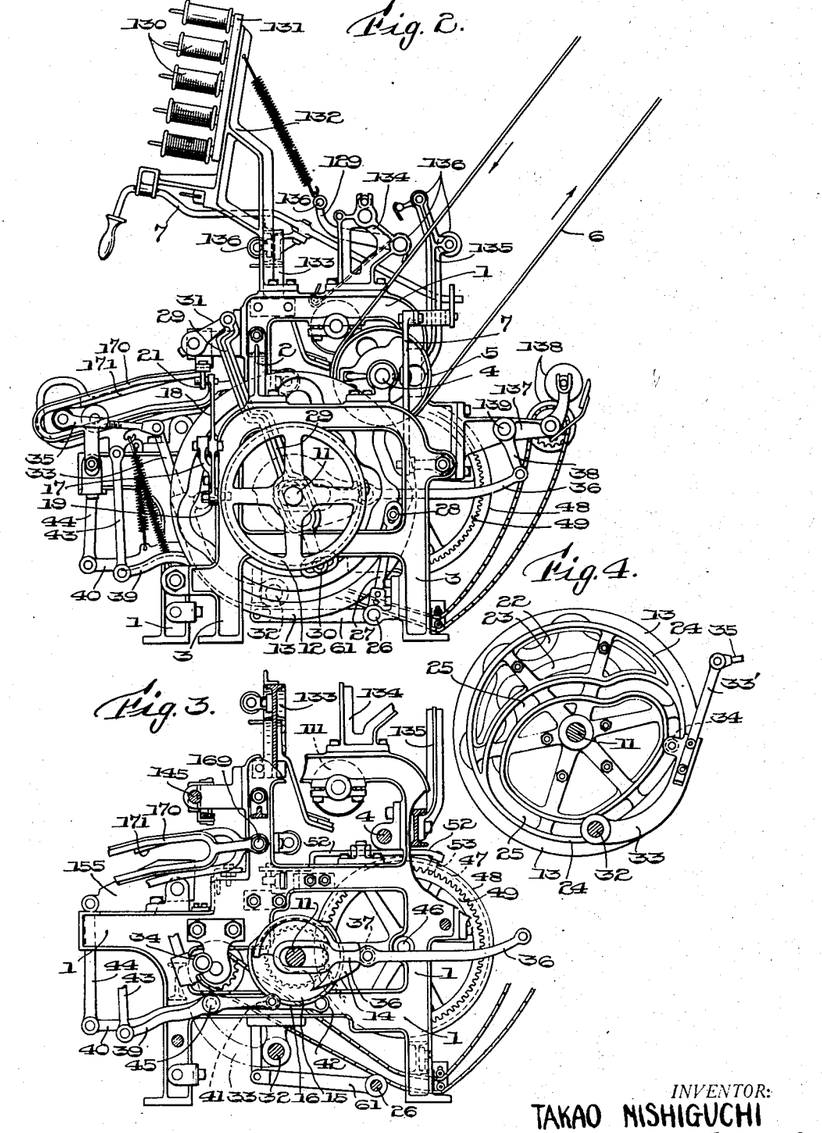
Figure 2 is a right side elevation.
Figure 3 is a section along the line III—III of Figure 1.
Figure 4 is a section along the line IV—IV of Figure 1.

The following is the explanation of the manner of performing this invention with the appended drawings:

As shown in Figs. 1 to 3, to a pair of right and left side main frames 1 and 1' are fixed by means of connecting rods 2 and 2 auxiliary frames 3 and 3' upon which a main shaft 4 is mounted and provided at its right end with a driving wheel 5 adapted to be turned in the direction indicated by arrows by means of an endless belt 6. The shaft 4 is caused to be started by a belt shifter 7, and has a hand wheel 8 fixed to its left end. Within the auxiliary frame 3' there is fixed to shaft 4 a small gear 9 which meshes with a large gear 10 (see Fig. 5) fixed upon a second shaft 11 mounted on the frame of the machine. To the right end of said shaft 11 are fixed a cam 12, and further cams 13, 14, 15, 16 exteriorly of and within the auxiliary frame 3, respectively.

An arm 17 fixed to the frame 3 has a rod 18 pivoted thereto and provided at its lower end with a roller 19 which engages in a guide slot 20 of the cam 12. At the upper end of the rod is a projection 21 capable of being shifted toward the right and left when the roller 19 is moved along the guide slot 20 by the rotation of the cam 12. The cam 13 has, as shown in Figure 4, an outer guide slot 22 and an inner guide slot 23, and also has a cam wheel 24 fixed to its inside which is provided with a guide slot 25. The outer slot 22 has a roller 28 engaged therewith as indicated in Figure 2, which is supported by the upper end of a rocking rod 27 fixed to a shaft 26 pivoted to the lower rear part of the frame 3. The shaft 26 is actuated by the movement of said roller 28. A roller 30 engaged in the inner guide slot 23 is also engaged in a closed ring slot formed at the end of a connecting rod 29, and the shaft 11 has its projecting end engaged in a slot formed at substantially the central part of said connecting rod whose upper end is connected to one end of a rocking rod 31 in order to rock the same.

Figure 8:
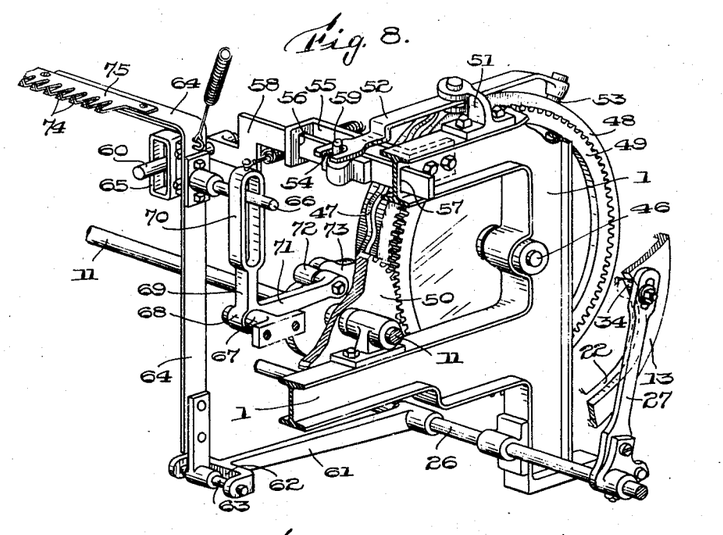
Figure 8 is a partial perspective of a mechanism for operating a thread guiding plate.

As shown in Fig. 4, in the guide slot 25 of the cam wheel 24 is engaged a roller 34 which is disposed near the upper end of an arm 33 connected at its lower end with a shaft 32 mounted on the center of the lower portion of the frame. The position at which a connecting rod 33' is attached to the arm 33 is made freely regulatable. The upper end of rod 33' is pivoted to a connecting rod 35 and arm 33 is thus rocked right and left along the guide slot 25 by the rotation of cam 24. As shown in Fig. 3, the cam 14 has engaged therewith a roller 37 which is mounted on the middle portion of a lever 36 having a closed slot in which one end of the cam 11 is inserted, while the lever is connected to a rocking rod 38 at its other end (see Fig. 2), so that it may be rocked by the rotation of the cam 14. The rollers 41 and 42 at one end of levers 39 and 40 engage with the cams 15 and 16, respectively, while connecting rods 43 and 44 are connected to the other ends of the same levers 39 and 40 which in turn are mounted together pivotally on the supporting shaft 45 of the frame 1 at substantially their centers. The connecting rods 43 and 44 are moved up and down respectively by means of rollers 41, 42 and levers 39, 40 by the rotation of the cams 15 and 16. The frame 1 has a short shaft 46 fixed thereto on its rear portion on which is rotatably mounted a gear 49 having upon its outer periphery a cam 48 secured which has a guide slot 47, and a gear 50 adapted to mesh with gear 49 is fixed upon shaft 11 (see Figures 4 and 8). As shown in Figure 8, in the guide slot 47 of cam 48 runs a roller 53 mounted on one end of a flat member 52 mounted pivotally on a supporting arm 51 fixed to the middle of the rear portion of the frame 1, the other end of the said flat member 52 being formed to a U-shape.

A supporting rod 55 secured to the frame 1 is bent at one end is provided with a guide slot 56 in the same plane with which there is a corresponding guide slot 57 in the frame 1. A projection 59 is fixed to a member 58 which extends through these slits 56 and 57 and is engaged with the said U-shaped member 54. The member 58 is provided at the left end with a long projection 60 engaging a rectangular ring guide member 65, which is secured to the inner surface of the vertical part of the frame 64 extending over substantially the whole distance between the frames 1 and 1', the lower part of the said frame 64 being hinged by a pin 63 to a U-shaped arm 62 formed upon the outer end of a rocking rod 61, whose inner end is fixed to the shaft 26 within frames 1 and 1'. A stud 66 is screwed to the outside of the vertical part of the said frame 64, and a crank arm 68 is pivoted to the shaft 67 fixed to the inside of the frame 1. The said stud 66 extends through the ring part 70 of a vertical arm 69, and the horizontal arm 71 of the crank arm 68 is provided at one end with a roller 72 which engages a cam 73 secured to the shaft 11. To the transverse part of said frame 64 is fixed a comb shaped plate 75 with the ends of the teeth turned up and provided with guide holes 74 for receiving the warp threads of the net. Thus, with the rotation of the cam wheel 48, the frame 64 moves right and left through motion transmitting mechanisms such as the roller 53 engaged with the guide slot 47 of said cam wheel 48, flat member 52, projection 59, member 58 and projection 60, and also moves up and down through the roller 34 engaged with the guide slot 22, arm 27, shaft 26 and rocking rod 61, with the rotation of the cam 13. At the same time, by the rotation of the cam 13 the frame 64 is moved to and fro through the roller 72 engaged with the cam 73, crank arm 68 and stud 66.

Figure 18:
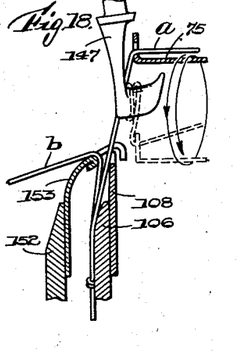
Figure 19:
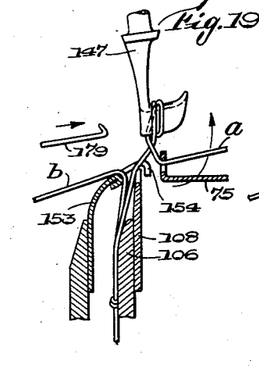
Figures 20, 21:
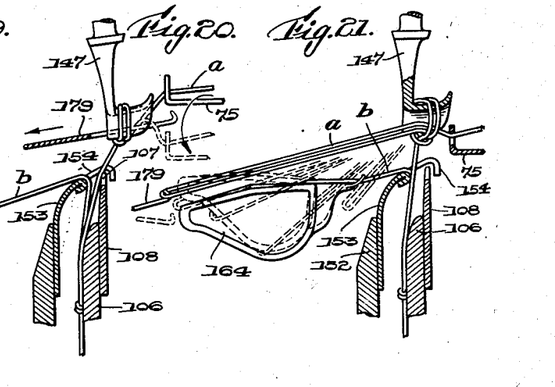

Such up-and-down, right-and-left, and to-and-fro movements of the frame 64 and thread guide plate 75 are necessary for winding the warp thread a, which has passed through the guide hole 74, around a knotter 147 as fully explained hereafter with reference to Figures 18 to 20 and are useful to the operation of knotting the warp and shuttle threads to make a fishing net.

Figure 5:
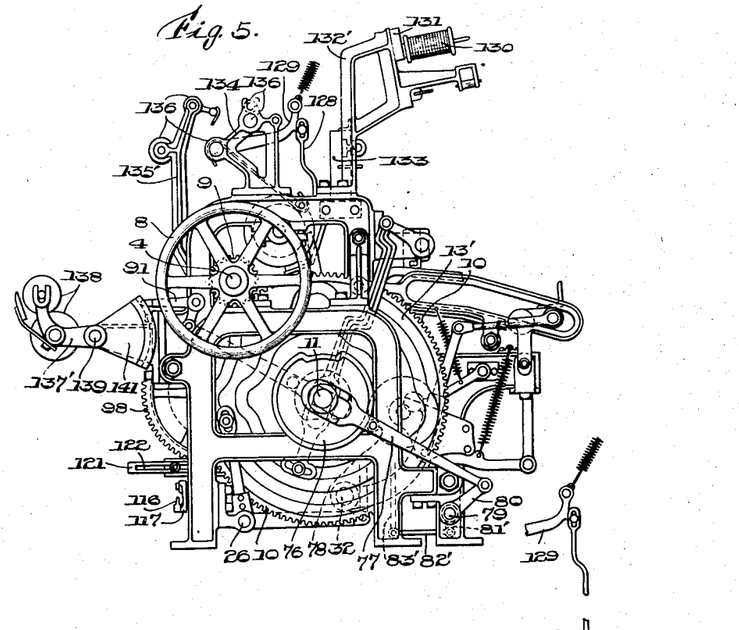
Figure 5 is a left side elevation.

As illustrated in Figures 1 and 5, a cam 76 is fixed to the shaft 11 at the outside of the left frame 3', and a lever 77 is engaged with the projecting head of the shaft 11 at its inner ring part and has at its intermediate portion a roller 78 engaged with the cam 76. To the outer end of said lever 77 is connected a rocking rod 80 fixed to the shaft 79 mounted on the fore legs of the frames 1 and 1', the said shaft 79 having fixed thereto rocking rods 81 and 81' inside the frames 1 and 1' to rock a push plate 84 (see Figure 13) through connecting rods 82 and 82' and rocking rods 83 and 83'.

Inside the frame 3' there are cam wheels 13' and 24' fixed to the shaft 11, which have similar constructions to the right side cams 13 and 24 and arranged symmetrically and operate in the same manner as the latter. The gear 10 is fixed upon the outer periphery of the cam 13'.

Figures 6, 7:
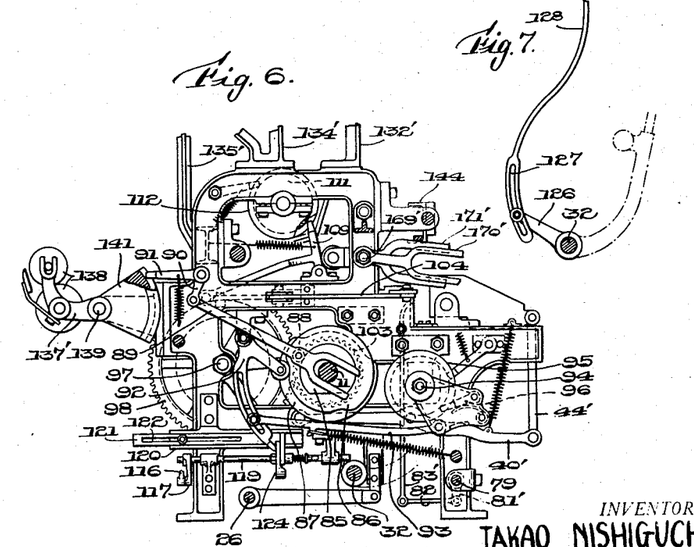
Figure 6 is a section along the line VI—VI of Figure 1.
Figure 7 is a front view of a needle for drawing a warp thread.

As shown in Figure 6, at the outside of frame 1' the cams 85, 86 and 87 are secured to the shaft 11. A lever 89 is engaged with the shaft 11 at its yoke end and has a roller 88 which engages the periphery of the cam 85. The lever 89 is connected at its outer end with a rocking arm 90, secured to a brake rod 91. Therefore, if the cam 85 rotates, the brake rod 91 will be moved against the tension of spring through the lever 89 and arm 90. While the rotation of the cam 86 rocks a C-shaped crank arm 92 pivoted to the frame 1', so that a braking wheel 95 fixed to a finished net delivery shaft 94 mounted on the front part of the frame may be brought into engagement with a braking rod 96 through a connecting rod 93, and by drawing the rod 93 said shaft 94 will cause partial rotation of said shaft 94 in a clockwise direction. The cam 87 has the same construction and operation as the mentioned right side cam 16 and is disposed symmetrically with it.

Figures 13, 14:
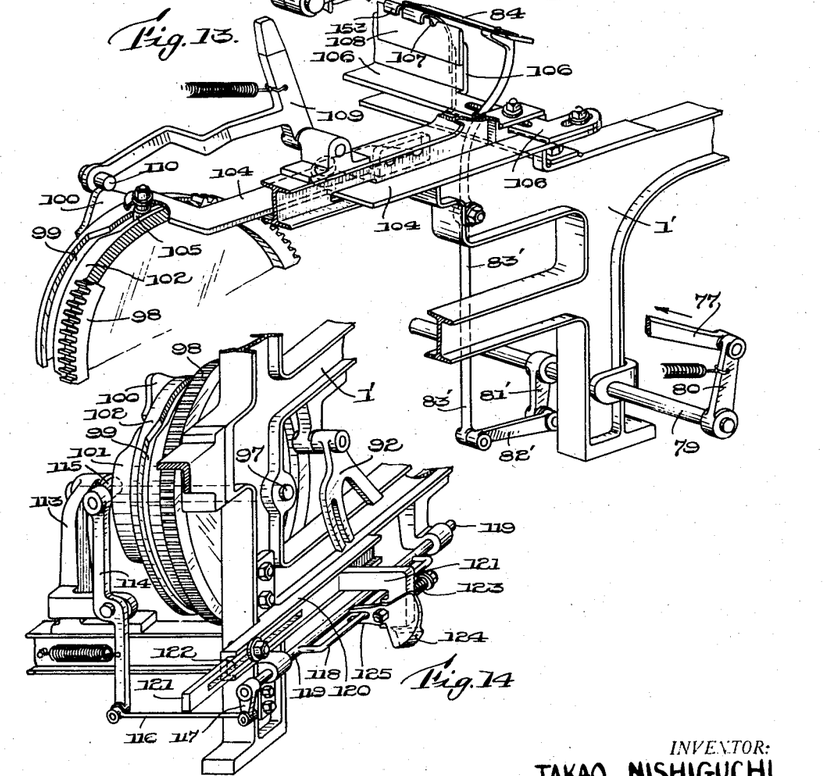
Figure 13 is a perspective of a push plate and middle plate sliding mechanism.
Figure 14 is a perspective of a formed net delivering mechanism.

The frame 1' is provided at the middle of its rear part with a shaft 97' as illustrated in Figure 14, on which is mounted a gear 98. A flange 102 on the side face of the said gear has a guide slot 99 and projection 100 formed at its outer periphery and also is provided upon its side wall with a cam 101. Gear 98 meshes within frame 1' with a gear 103, on shaft 11 as shown in Figure 6. As shown in Figure 13, in the guide slot 99 a roller 105 runs which is carried upon one end of a stepped flat member 104 connected to the frame 1', the said flat member extending through the frame 1' at the middle thereof and also having one end of a supporting plate 106 connected to its end. The said supporting plate 106 has a plate 108 fixed thereto on which equally-spaced notches 107 are formed. It is slid to the right and left by the rotation of the cam 102, and the projection 100 of gear 98 is engaged by a roller 110 at one end of a branch of a braking rod 109 pivoted to the frame. Further, the said braking rod 109 acts upon a braking wheel 112 fixed to a net take-up roller 111 as indicated in Figure 6. The cam 101, as shown in Figure 14, is engaged by a roller 115 at the upper end of a rocking rod 114 pivoted to the base of bearing arm 113 of a shaft 97 which is mounted on the rear part of the frame. To the lower end of the said rod 114 is connected a shaft 119 through a connecting rod 116 and rocking rod 117. The shaft 119 has a branch 118 and is mounted rotatably upon the lower end of the outside of the frame 1'. Above shaft 119 a channel member 120 is attached to the frame and an L-shaped member 121 is secured to said channel member which is provided with a guide slot 122 to make the setting of the position of member 121 regulatable.

To the projecting part of the said member 121 is pivoted a segmental cam 124 kept in close contact with the same by a spring 123 urging the cam against it. The cam 124 is provided with a fork 125 at the inner end so as to hold the branch shaft 118, and the end of the mentioned C-shaped crank arm 92 in contact with the segmental cam surface (Fig. 6). By the rotation of the cam 101, the shaft 119 is rotated through the rocking rod 114, connecting rods 116 and 117. Also, by the rocking of the branch shaft 118, the segmental cam 124 is caused to ride on or off the projecting part of the L-shaped member 121, thus making a slight difference in the rocking operation of the C-shaped crank arm 92 and consequently in the angle of the rotation of the finished net delivery shaft 94 explained before, so that the tension of the net delivery is regulated automatically.

As shown in Figures 7 and 5, a rocking rod 126 is fixed to the shaft 32 within the lower portion of the frame 1'. A crank rod 128 is connected to rod 126 and has a guide slot 127 and the upper end of rod 128 is connected to an arm 129 for supporting the thread tensioning rod. By the rotation of the shaft 32 the said arm 129 is moved up and down automatically to loosen and tension the thread.

Figures 10, 11, 15:
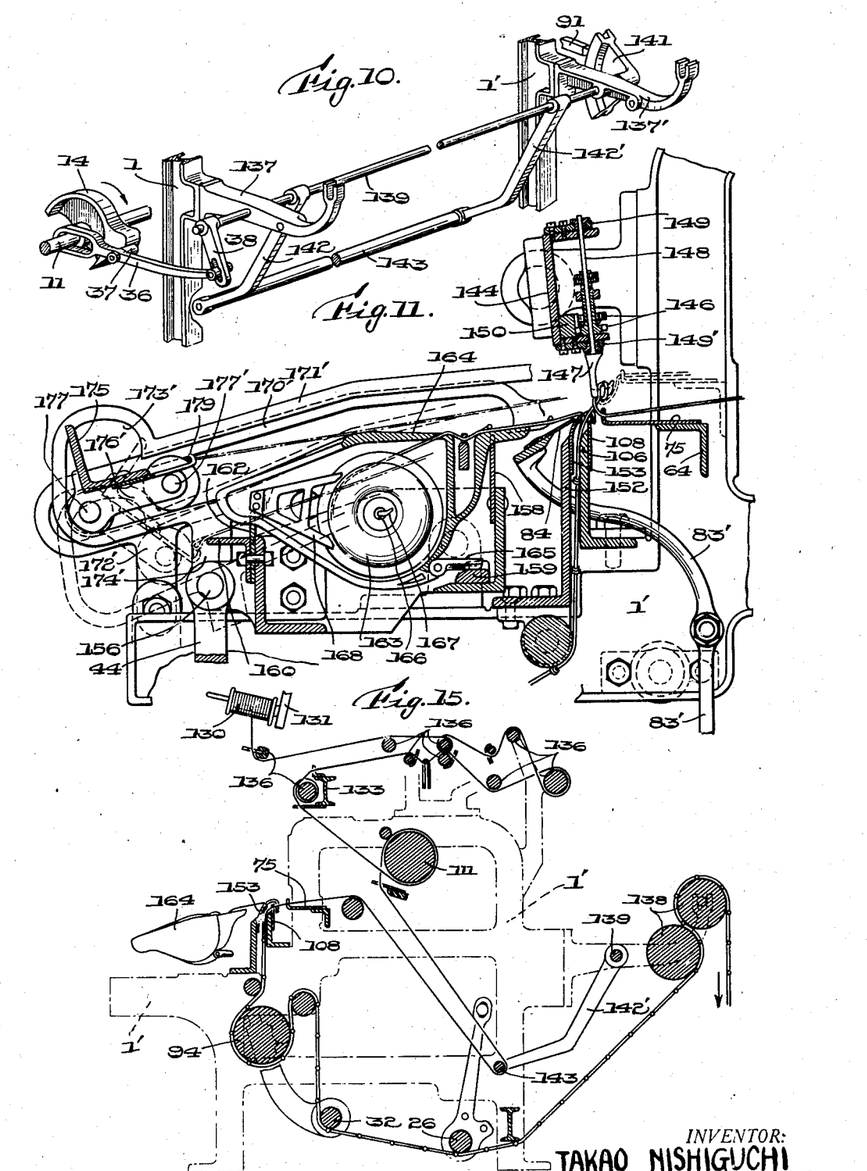
Figure 10 is a perspective of a warp thread tension roller.
Figure 11 is a side section of a mechanism for forming the knots of the net.
Figure 15 is a view showing the course of the net thread.

Now, referring to Figures 1, 3 and 15, on the frames 1 and 1' are fixed supporting frames 132 and 132', beam frame 133, pentagonal supporting frames 134 and 134' and supporting vertical frames 135 and 135', the said supporting frames 132 and 132' being surmounted by a wooden bobbin board 131 on which warp thread bobbins 130 are arranged. A roller 136 is mounted rotatably on each of the above-mentioned supporting frames, and a finished net winding roller 138 is mounted on the supporting arms 137 and 137' projecting backward of the frames 1 and 1'. The said arms are provided with a shaft 139 as shown in Figure 10. Upon the outside of the arm 137, the shaft 139 is provided at its end with a rocking rod 38 and receives rocking motion through the cam 14, roller 37 and rod 36. While, on the outside of the arm 137', the other end of said shaft is attached a segmental braking wheel 141 engaged with the braking rod 91 actuated by the cam 85. The rocking arms 142 and 142' have their upper ends fixed to the shaft 139, and a shaft 143 is connected at its lower end to the arms 142 and 142'. The thread delivered from the bobbin 130 is passed over roller 136, take-up roller 111, shaft 143 and the guide hole 74 of the plate 75 and then each warp thread is knotted together with a shuttle thread delivered from a shuttle 164 to make a net, and the thus-obtained net is delivered through the finished net delivery shafts 94, 32, 26 and 138.

Figure 9:
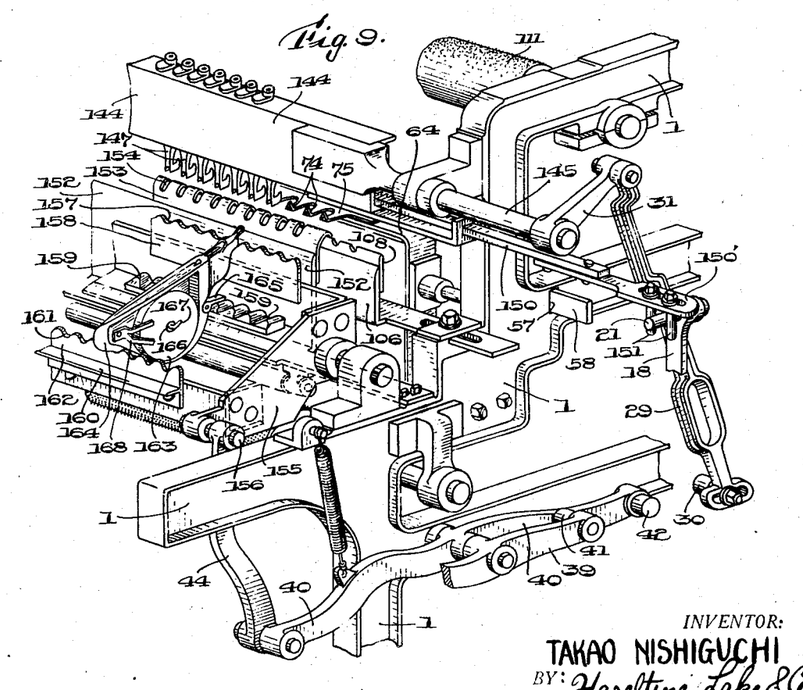
Figure 9 is a partial perspective of a mechanism for forming the knots of a net.

Next, with reference to Figures 9 and 11, a channel-shaped knotter chamber 144 is fixed to the one end of a shaft 145 mounted on the front part of the frame 1, while a rod 31 is secured to the outer end of the said shaft 145, said rod being connected at its free end with lever 29 which has a roller 30 at its other end engaged with the inner guiding slot 23 of the cam 13 (Fig. 1). The knotter chamber 144 comprises rods 149 each of which carries a pinion 146 and has a knotter 147 at the bottom, in such manner that each rod may be rotated upon bearings 149 and 149' provided at the upper and lower parts of the said chamber, these rods 148 being arranged with a certain space between them. A group of pinions 146 is engaged with a long rack 150 so as to rotate together. A member 150' fixed to the outer end of the said rod is provided with two pins 151 which engage the pin 21 of the rocking rod 18 communicating by means of its lower roller 19 with the cam wheel 12, so that the knotter chamber 144 is moved to and fro by means of the roller 30, lever 29, rod 31 and shaft 145 by the rotation of the cam 13 and thus swings the knotters 147. Further, by the rotation of the cam 12 the lever 18 is rocked along the slot 20 and the knotters 147 are rotated simultaneously through motion transmitting mechanisms such as the pins 21 and 151, member 150' and the long rack 150. Such swinging and rotating movements of the knotters 147 are necessary for making a net as illustrated in Figures 16 to 24, which will be explained clearly hereafter.

The comb plate 153 is fixed to the angle member supporting plate 152 secured upon the frame 1 under the knotter chamber 144 and is provided with notches 154, each of which is spaced to cooperate with each of the knotters 147. Within said comb plate the saw-toothed plate 108 is located being mounted on the aforementioned supporting plate 106. An open casing 155 is mounted on the frames 1 and 1', along the supporting plate 152, and is provided at the front portion with a short shaft 156. The connecting lever 44 connected to said shaft 156 is connected at its lower end with the rocking lever 40 so as to operate the casing 155 by the movement of the cam 16. To the rear wall of the casing 155 is fixed a plate 158 having notches 157 corresponding to the knotters 147, and under the same there is a rack-shaped member 159, while to its front wall is fixed a comb plate 162 having notches 161 upon the corresponding notches 157 and 161 on which a shuttle 164 is mounted containing a shuttle bobbin 163. Each shuttle 164 is set upon the rack 159 by means of a finger 165 provided at the bottom portion of said shuttle. The shuttle bobbin 163 has a hole 166 at the center thereof and is rotatably mounted on the small pin 167 of the shuttle 164 and is retained in place by A-shaped spring 168.

Figure 12:
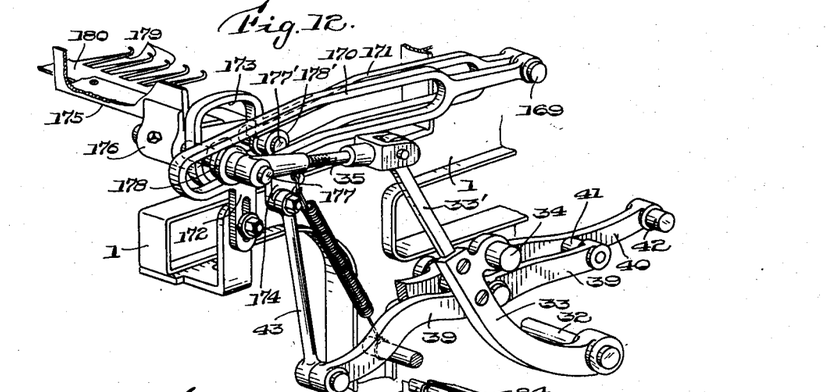
Figure 12 is a perspective of a drawing needle operating mechanism.

As shown in Figures 11 and 12, upon the outer sides of the frames 1 and 1' there are provided short shafts 169 and 169' (see Fig. 6) which have guide frames 170, 170' and 171, 171' pivoted thereto, the said frames 170 and 170' having lugs 172 and 172' at their lower portions which are fixed to the frames, while 171 and 171' have enlarged portions 173 and 173' at their ends and are provided at the lower portions with lugs 174 and 174', the said lug 174 being disposed in cooperating relation with the cam 15 by means of the roller 41 through the connecting rod 43 and rocking rod 39, while the lug 174' corresponds to the mentioned lug 174 and has similar connecting mechanism. Lugs 176 and 176' are provided at both ends of the angle 175 between the guide frames 171 and 171'. To each lug is secured a pair of small axes 177 and 177' on which rollers 178 and 178' are rotatably mounted. The roller 178 is fitted in the guide slots of the frames 170 and 170' and the end of its shaft 177 is actuated through the connecting rods 35, 33' and 33 by the rotation of the cam 24 with which the roller 34 (see Figure 4) is engaged. The roller 178' engages in the guide slots of the frame 171 and 171'. Further, a plate 180 having needles 179 arranged in parallel is fixed to the rear of the bottom portion of the angle 175, the said needles corresponding to the knotters 147, so that with the rotation of the cam 24, the rollers 178 and 178' run along the guide slots of the frames 170 and 171 respectively and consequently the angle 175 on the lug 176 fixed to the shafts 177 and 177' of these rollers 178 and 178' is moved to and fro with the comb plate 180 by the reciprocal rolling movement of the rollers 178 and 178', with the result that the needles 179 also perform a to-and-fro movement, which effects a net forming operation as explained in Figures 19 to 21.

When as indicated in Figures 12 and 11 the connecting rod 43 descends by virtue of the movement of the lever 39 and consequently the guide frames 171 and 171' descend to the position indicated in broken lines in Figure 11 with their pivot 169 as the fulcrum, the angle 175 and plate 180, and accordingly the needles 179 are inclined towards the position also indicated in broken lines, such inclining movement of the needles 179 being necessary for the net forming operation described hereafter with reference to Figure 21. At this point, the shuttle supporting frame 162 brings the angle member 160 into engagement with the warp thread loop by the raising of the connecting rod 44, thereby releasing the said loop from the needles as explained hereinafter.

Next will be explained briefly the operation of making a fishing net with double knots in this machine with reference to Figures 16 to 24.

Figures 16, 17:
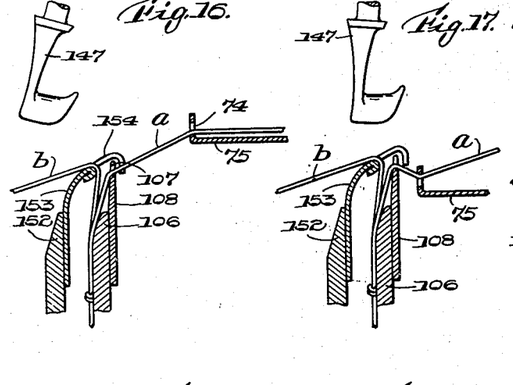
Figures 16 to 24 are partial views showing the order of the stages of making the nets. Throughout the views the same reference numbers denote the same parts.

The warp thread $a$ delivered from the bobbin 130 extends the previously formed knot between the angle or supporting members 106 and 152, passing through the guide hole 74 of the thread guide plate 75 and the notch 154 of the comb plate 153 and then through the notch 107 of the saw-toothed plate 108, while the shuttle thread $b$ from the bobbin 163 in the shuttle 164 arrives at the knot through the notch 154 of the comb plate 153 as shown in Figure 16. Thus, when the machine is started, the guide plate 75 is shifted to the left one pitch together with the plate 108, while being slightly lowered by the actuating mechanisms described before. At the same time, the knotter 147 moves forward while making one rotation to the right, and presents the condition as shown in Figure 17, when the hole 74 of the thread guide plate 75 rises to the middle part of the knotter 147 and also rotates twice over the knotter 147 as illustrated in Figure 18 and stops immediately beneath the same as shown in broken lines and takes its position at the center of the notch 154.

Figure 22:
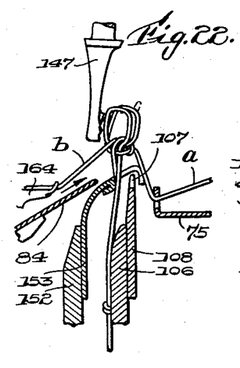
Figures 23, 24:
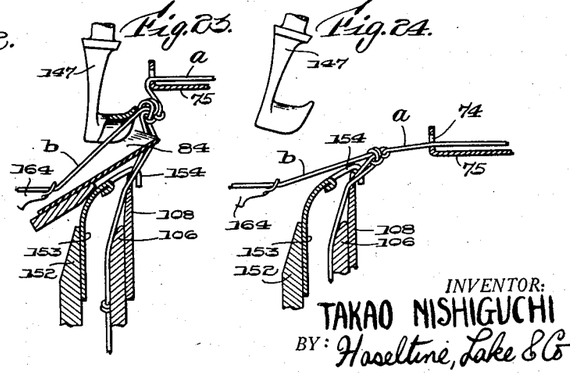

Next, the knotter 147 performs a reverse rotation, namely, one rotation to the left as shown in Figure 19 and the warp thread $a$ is crossed below the knotter to form a double thread ring, whereupon the needle 179 is brought forward as indicated in Figure 20 and passes through the hollow part of the knotter 147 around which the double thread ring is wound. In the meantime, the thread guide plate 75 is operated to engage the warp thread $a$ with the needle 179 and, as shown in Figure 21, withdrawing the loop of the warp thread $a$ through the double thread ring, passes over the shuttle 164. As explained before, the needle 179 inclines downward and at the same time the frame 162 serving to support the rear part of the shuttle is raised to allow the tail of the shuttle to pass through the loop of the warp thread $a$ as indicated in broken lines in Fig. 21. Hence, if the loop is released from the needle 179 by the lifting angle member 160 of the frame 162, when it is drawn along the under surface of the shuttle by the weight of the roller 143 which causes a tension of the warp thread to be effected and after catching and pulling out the shuttle thread $b$, passes through the hollow part of the knotter 147, so that although the warp $a$ at length returns to the original position, the shuttle thread passes through the hollow part above and remains caught by the thread $a$ as illustrated in Figure 22. Then, the plate 84, moves forward, while the knotter 147 recedes, and since the lower portion of the knot which consists of the warp thread $a$ and shuttle thread $b$ is held back by the plate 84, the knotter 147 is easily released from the knot above because of its rearward movement. Next, the thread rings above formed loosely and doubly at the front and back will first have one ring, for example, the front ring, suitably tightened and then the back ring strongly tightened.

The thus-formed knot is lowered to a desired distance by the rotation of the pulling-off roller 94 shown in Figure 15 and takes up the position shown in Figure 16. Then, the tensioning roller 143 is lifted to continue the next knot forming operation as explained before. In the next operation the warp thread $a$ is shifted by one pitch in one direction, for instance, to the right to carry out the knotting operation already referred to with the adjacent shuttle thread $b$, thus forming a strong double knot.

It is needless to mention that the present invention is applicable to a single knot net.

Having now fully described my invention, I claim:

1. Machine for making nets, which comprises a movable knotter chamber member, a plurality of knotters having knotter heads and arranged therein, a driving mechanism for rocking said chamber to and fro, a mechanism for rotating said knotters intermittently, a plurality of warp thread bobbins, a thread guide plate with a number of perforations therein serving to pass said warp threads therethrough, a mechanism for winding warp threads upon the knotter heads by imparting up and down, right and left and to and fro movements to said plate, a plurality of shuttles for containing shuttle bobbins, a movable casing serving to contain a row of said shuttles, an actuating link mechanism for rocking said casing with a supporting shaft as the fulcrum, a movable angle member having rollers at both sides thereof and carrying a row of needles, guide rails for allowing the rollers at both sides of the angle member to travel reciprocally thereon, an actuating link mechanism for moving said angle member together with the needles forward and backward above the shuttles so as to allow the needles to first pull out warp thread loops through the knotter heads and then release said warp thread loops after the same have thus been pulled out, an operating mechanism for passing the mentioned released warp thread loops along the bottoms of the shuttles to pull them into the knotter heads and bring out the shuttle threads with them and operating means for tightening the knots initially formed loosely by the warp and shuttle threads.

2. The machine for making nets, according to claim 1, wherein the actuating mechanism for rotating the knotters simultaneously comprises pinions fixed to the knotters, movable racks engaged with said pinions, link members for causing said racks to move, and a cam engaged by a roller upon one of said link members.

3. The machine for making nets according to claim 1, wherein the driving mechanism for rocking the knotter chamber member to and fro comprises a rocking rod fixed to the body of said chamber member, link members connected to said rod, a roller connected to one of said link members, and a cam engaged by said roller.

TAKAO NISHIGUCHI.